United States Patent Office 2,733,168
Patented Jan. 31, 1956

2,733,168

TIN-ZINC BASE ALLOYS

Allen W. Hodge and Robert L. Ballard, Columbus, Ohio, assignors, by mesne assignments, to Reynolds Metals Company, Richmond, Va., a corporation of Delaware No Drawing. Application September 8, 1952,
Serial No. 308,506

7 Claims. (Cl. 117—50)

This invention relates to alloys and more particularly to tin-zinc base alloys. These alloys of our invention are especially well adapted for use in the soldering of aluminum.

A solder for aluminum must possess certain characteristics before it can be considered satisfactory for use in commercial production and adapted for the home workshop. If the solder is deficient in any of these characteristics it is deficient as a solder. Our invention relates to a low melting or soft solder, one which melts between 500° F. and 700° F., and which combines many of the characteristics desirable in a soft solder.

The soldering of aluminum has long presented many problems and it only has been in recent years that the reasons for the difficulties in soldering aluminum have been clearly recognized. The most serious difficulty has been the inability to obtain a soft solder which is adherent to the base metal and is corrosion resistant and which is otherwise desirable.

The aluminum base brazing alloys for joining aluminum are the best known and most widely used of the high melting or hard solders. Brazed joints are strong, resistant to electrolytic corrosion and otherwise desirable. However, brazing does not enjoy more extensive use because of the fact that the brazing alloys melt at such a high temperature that special equipment, conditions and training are necessary to braze successfully. The solder of our invention is a low melting solder which may be applied with a minimum of equipment by untrained hands, yet is a solder which forms a joint which may be compared more favorably with a brazed joint. This solder is eminently satisfactory for use in most commercial and non-commercial applications in which a solder joint is satisfactory.

Poor adherence of solder to the aluminum base results when the ever-present aluminum oxide film on the aluminum is incompletely removed in the soldering operation. This film must be entirely overcome and dislodged before solder will form a tenacious bond with the metal therebeneath, otherwise incomplete removal of the oxide film results in a solder joint which is non-uniformly adherent and of less strength, often of considerably less strength, than the theoretically perfect joint. The oxide film is commonly removed by mechanically abrading the surface to be coated prior to soldering. Additionally, fluxes of different types may be used, several of which are quite effective. Or, a combination of mechanical abrasion and an effective flux may be used. This pre-treatment results in a good joint but one which is susceptible to electrolytic corrosion partially induced by the flux. A more simple soldering operation is preferred and, in fact, needed for the most effective utilization of aluminum since, in many applications, the use of aluminum is often avoided because of the difficulty in joining, although it is otherwise the most desirable. A solder is needed which will be able to penetrate the oxide film with a minimum of external assistance and completely wet and bond with the metal beneath the oxide film. Mercury compounds are known to pierce the oxide film at high temperatures but are undesirable because of the excessive corrosion that is produced.

Another requirement of a solder is that it must be corrosion resistant to a substantial degree before it is acceptable in all but the least corrosive conditions. This corrosion is a result of the differences in electrolytic potential of the solder and base metal when in contact with one another. The theoretical solution to this problem other than to use aluminum as a solder is to provide an alloy made up of a combination of metals that will have a potential identical to that of the aluminum alloy to be soldered and yet an alloy which possesses the needed strength, fluidity, low melting point and other qualities necessary for a solder. Nevertheless, solders possessing the identical electrolytic potential as aluminum usually are found to be very corrosive. This may result from the fact that the standard for measuring solution potentials, the aqueous sodium chloride solution, does not precisely indicate what the solution potentials will be under varying conditions. Additionally, it is thought that tin-zinc solders and other solders only adhere to the aluminum in spots due to the failure to effectuate complete removal of the oxide film. This results in a concentration of the corrosive action at the points of metal-to-metal contact, the oxide film electrolytically insulating the other areas of the joint.

Alloys of tin and zinc have been found to have many desirable characteristics as aluminum solders particularly alloys containing a greater proportion of tin. These solders are low melting, possess a sufficient strength for most purposes, and approximate the potential of aluminum. However, these solders are not perfect. Many alloys have been made utilizing the tin-zinc base and employing added constituents to improve the solder particularly to improve its oxide penetrating powers and its resistance to electrolytic corrosion. These many attempts can not be considered completely successful.

We have discovered that, by employing very small amounts of the element of beryllium as an alloying constituent with this tin-zinc base alloy, an alloy can be produced which possesses exceptionally desirable properties as a solder for aluminum alloys. The beryllium, added in amounts up to 0.2%, imparts to the solder the greatly enhanced ability to break through the overlying aluminum oxide film and to produce a uniform metal-to-metal contact with the underlying aluminum, and additionally these small additions of beryllium greatly enhance the soldered joint's resistance to electrolytic corrosion, while preserving the solder's strength and low melting characteristics.

These new alloys containing beryllium are preferably compounded by incorporating the beryllium in the form of an aluminum-beryllium alloy since the beryllium alone is difficult to handle and is only difficultly soluble in tin and zinc alone. This method of compounding the alloy results in an alloy of tin, zinc, aluminum and beryllium. It is believed that beryllium acts as a grain refiner and hardener in the solder alloy. The solder is physically hard, making it practical to use it as a hand solder in the form of a stick, whereby the user may easily abrade the surface with the stick as he solders and aids in the removal of the oxide film.

A very definite advantage in the solder of our invention resides in the significant saving in the amount of solder needed to obtain a satisfactory joint. The excessive waste of common solders partially results from a combination of the solder's softness and the necessity of applying too much solder in attempting to pierce the oxide film and coat the base metal. Tests were made using the solders of the following composition:

A. 70% Sn, 26% Zn, 3.9 Al, 0.1% Be
B. 70% Sn, 30% Zn in the form of sticks one-fourth an inch square. The metal surface was only lightly abraded with the solder stick while applying the solder and in all cases the abrasion was equal for the different solders tested, with no flux used. The joints were made on 16-gage sheet aluminum, seven-eighths of an inch wide with a three-sixteenths inch overlap. The following table summarizes the result of the tests in making the twenty one joints.

| Solder | Solder Required, Inches | Nature of joint |
|---|---|---|
| A | 1 | Smooth and uniform. |
| B | 5½ | Thick and Non-uniform. |

The solder containing beryllium upon application to the metal readily flowed over and wet the metal surface forming an even and smooth coat. It permitted a greater saving in solder than other solders lacking beryllium. This result has been found to be consistent with other alloys of our invention. This unexpected saving of solder is very important in considering its usefulness in industrial operations where cost is important. The beryllium solder joints were smooth, of uniform thickness and strong. The solder flowed evenly over the metal and was uniformly adherent, while the joints formed by the straight tin-zinc solder were of non-uniform thickness, required considerable more solder to obtain a joint of a strength comparable with the beryllium solder and were not uniformly adherent. The poor joint probably is partially caused by the inability of the solder to wet the entire surface and uniformly adhere to the base metal. It was impossible to obtain a joint of satisfactory strength using the straight tin-zinc solder without substantial abrasion to remove the oxide film and without using a substantial amount of solder.

Another outstanding advantage of the solders relates to their resistance to corrosion whether in a dry atmosphere or in a humid corrosive atmosphere. It has been discovered that soldered joints in which the solders contain beryllium in amounts up to .2% are appreciably more resistant to electrolytic corrosion than are soldered joints lacking beryllium. Joints made with a beryllium solder were found to be strong after being subjected to corrosive conditions which normally would be expected to corrode a soldered aluminum joint. This marked resistance to corrosion greatly enhances the solder's usefulness under widely variant conditions and permits them to be used as multi-purpose solders.

It has been found most practical to compound soldering alloys with a beryllium content up to 0.1%, although compositions containing up to 0.20% are found to possess the desirable characteristics imparted to the solder by the beryllium addition. Since the beryllium is added with a carrier it is necessary in one method of compounding the solder to include a certain amount of aluminum as the carrier. It is desired that the aluminum content be prevented from going much above 5% in order to avoid altering the characteristics of the tin-zinc base alloy.

The solder may be conveniently compounded by adding 10 ounces of an alloy of 95 per cent aluminum and 5 per cent beryllium to 175 ounces of tin at 1650° F. The tin is melted in a graphite crucible with powdered charcoal spread on the surface of the tin to prevent oxidation. The contents of the crucible are stirred gently while the aluminum-beryllium alloy appears to go into solution with the tin. The temperature is then lowered to 1000° F. and 65 ounces of zinc are added. The surface is cleared of dross and the solder cast at 800–1000° F. in sticks or in another form as desired. When cooled the alloy is immediately usable as a solder for aluminum. The beryllium may be added to the melt alone, extreme care being taken to avoid vaporization of the metal since the fumes are poisonous, or it may be added as an alloy of another metal not detrimental to the advantages obtained by the beryllium addition. Aluminum has been found to be a very effective carrier metal for incorporating suitable quantities of beryllium in the solder and for maintaining the effectiveness of the beryllium. Minor quantities of other metals may be present in the alloy if the desirable characteristic of our solder is not materially subverted.

Our solder may be applied in the stick form much like the normal tin-lead solders. An iron or torch producing a sufficiently high temperature is applied to the aluminum base at the area of the intended joint. The stick is gently rubbed over the surface to aid in breaking the oxide film and distribute the solder. When the melting temperature of the solder is reached the solder gradually spreads over the adjacent metal surface forming an evenly adherent coat. Since this solder uniformly and evenly coats the aluminum surface, a strong joint is obtained with a minimum amount of solder. Excellent joints may be made by other methods common in the soldering art.

It has been found desirable to alter the composition of the solder within the ranges contemplated by our invention to obtain minor modifications in the general characteristics of the solder. We have tested many solders of our invention including a solder comprising 90 per cent tin, 6 per cent zinc, 3.7 per cent aluminum, .06 per cent beryllium, and .02 per cent chromium and a solder comprising 86.5 per cent tin, 9.5 per cent zinc, 3.9 per cent aluminum, .03 per cent beryllium and .05 per cent chromium, and they have all possessed the characteristics which were sought for a solder for aluminum and aluminum alloys.

We have explained the principle and mode of operation of our invention and have described specific examples of the manner in which it may be practiced. However, we desire to have it understood that, within the scope of the appended claims, the invention may be practiced in alloys having compositions differing from those particularly described and further variations and modifications, such as would occur to one skilled in the art, are considered part of the invention.

We claim:

1. An alloy consisting of from about 5% to 30% zinc, from about 1% to 5% aluminum, from about .005% to .20% beryllium, and the remainder tin.

2. A tin-zinc base alloy consisting essentially of about 5% to 30% zinc, about 1% to 5% aluminum, about .005% to .20% beryllium, the balance essentially tin, and characterized by good abrasiveness when applied as a solder to aluminum whereby the solder breaks the oxide film and wets the aluminum being soldered and further characterized by good corrosion resistance when used as a solder for aluminum.

3. A tin-zinc base alloy consisting essentially of about 70% to 90% tin, about 5% to 30% zinc, and .005% to .02% beryllium, said alloy characterized by good abrasiveness when applied as a solder to aluminum whereby the solder breaks the oxide film and wets the aluminum being soldered and further characterized by good corrosion resistance when used as a solder for aluminum.

4. A tin-zinc base aluminum solder having good abrasion and wetting characteristics and having good corrosion resistant qualities consisting essentially of beryllium in amounts ranging from .005% to .2%, zinc in amounts ranging from 5% to 30%, and the remainder tin.

5. A tin-zinc base alloy consisting essentially of about 5% to 30% zinc, about .005% to .2% beryllium, and about 70% to 90% tin, said alloy being characterized by greater abrasiveness, wettability and flowability when applied as a solder to aluminum than characterizes an alloy of the same composition but devoid of said amount of beryllium.

6. The method of soldering aluminum which comprises applying thereto and mechanically abrading therewith in the presence of heat an alloy which consists essentially of from about 70% to 90% tin, from about 5% to 30% zinc, and from about .005% to .02% beryllium, whereby the oxide film on the aluminum being soldered is broken up and the solder is caused to flow evenly and smoothly to wet the aluminum being soldered.

7. The method of producing a soldered joint on aluminum which is smooth and uniformly adherent and resistant to corrosion which comprises applying to the aluminum to be soldered in the presence of heat an alloy which consists essentially of from about 70% to 90% tin, from about 5% to 30% zinc, from about 1% to 5% aluminum, and from about .005% to .02% beryllium and lightly abrading the aluminum being soldered with said alloy as portions of said alloy melt and coat the aluminum being soldered.

References Cited in the file of this patent

UNITED STATES PATENTS 2,467,780   Reinhold _____ Apr. 19, 1949

OTHER REFERENCES

Buertler et al.: The Systems Tin Germanium and Tin Beryllium, published by the International Tin Research and Development Council, February 1937, Series A, No. 50; 23 pages; pages 17 and 23 relied on.